United States Patent

Tasaki

(10) Patent No.: US 7,756,698 B2
(45) Date of Patent: Jul. 13, 2010

(54) SOUND DECODER AND SOUND DECODING METHOD WITH DEMULTIPLEXING ORDER DETERMINATION

(75) Inventor: Hirohisa Tasaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/907,922

(22) Filed: Oct. 18, 2007

(65) Prior Publication Data

US 2008/0052087 A1    Feb. 28, 2008

Related U.S. Application Data

(62) Division of application No. 11/701,461, filed on Feb. 2, 2007, now abandoned, which is a division of application No. 10/222,902, filed on Aug. 19, 2002, now Pat. No. 7,191,126.

(30) Foreign Application Priority Data

Sep. 3, 2001    (JP)    ............................. 2001-266253

(51) Int. Cl.
*G10L 19/02* (2006.01)
*H04J 7/00* (2006.01)

(52) U.S. Cl. ...................... 704/201; 704/221; 704/500; 375/240.23

(58) Field of Classification Search .............. 704/200.1, 704/201, 203, 211, 229, 500, 501, 503, 221

See application file for complete search history.

(56) References Cited

U.S. PATENT DOCUMENTS

| | | | |
|---|---|---|---|
| 4,821,324 A * | 4/1989 | Ozawa et al. ................ 704/216 |
| 4,993,022 A * | 2/1991 | Kondo et al. ................ 370/462 |
| 5,253,326 A * | 10/1993 | Yong ............................ 704/200 |
| 5,265,167 A | 11/1993 | Akamine et al. |
| 5,600,754 A * | 2/1997 | Gardner et al. ............... 704/221 |
| 5,717,394 A | 2/1998 | Schwartz et al. |
| 5,864,650 A * | 1/1999 | Taniguchi et al. ........... 704/220 |
| 5,956,674 A | 9/1999 | Smyth et al. |
| 6,078,879 A * | 6/2000 | Taori et al. ................... 704/207 |
| 6,131,083 A * | 10/2000 | Miseki et al. ................ 704/217 |
| 6,230,130 B1 * | 5/2001 | Castello da Costa et al. ..... 704/258 |
| 6,349,284 B1 * | 2/2002 | Park et al. .................... 704/500 |
| 6,405,338 B1 * | 6/2002 | Sinha et al. .................. 714/752 |

(Continued)

FOREIGN PATENT DOCUMENTS

JP    56-78898 A    6/1981

(Continued)

OTHER PUBLICATIONS

Channel Coding, 3GPP TS 05.03 V8.6.1(1999).

(Continued)

*Primary Examiner*—Martin Lerner
(74) *Attorney, Agent, or Firm*—Birch, Stewart, Kolasch & Birch, LLP

(57) ABSTRACT

A sound encoder multiplexes a plurality of codes into a sound code in an order determined by a multiplexing order determination unit (12), and a sound decoder demultiplexes the sound code into a plurality of codes one by one in an order determined by a demultiplexing order determination unit (14).

2 Claims, 10 Drawing Sheets

U.S. PATENT DOCUMENTS

| | | |
|---|---|---|
| 6,487,535 B1 | 11/2002 | Smyth et al. |
| 6,760,699 B1 * | 7/2004 | Weerackody et al. ......... 704/233 |
| 6,882,634 B2 * | 4/2005 | Bagchi et al. ............... 370/338 |
| 6,952,432 B2 | 10/2005 | Watanabe et al. |
| 6,975,254 B1 | 12/2005 | Sperschneider et al. |
| 6,978,236 B1 * | 12/2005 | Liljeryd et al. .............. 704/219 |
| 7,136,418 B2 * | 11/2006 | Atlas et al. .................. 375/242 |
| 7,191,126 B2 * | 3/2007 | Tasaki ........................ 704/227 |
| 7,315,817 B2 * | 1/2008 | Tasaki ........................ 704/229 |
| 7,603,270 B2 * | 10/2009 | Mossakowski ............. 704/201 |
| 2003/0019348 A1 | 1/2003 | Tasaki |

FOREIGN PATENT DOCUMENTS

| | | |
|---|---|---|
| JP | 62-1000 A | 1/1987 |
| JP | 63-37400 A | 2/1988 |
| JP | 3-7120 B2 | 1/1991 |
| JP | 6-259096 A | 9/1994 |
| JP | 7-506439 A | 7/1995 |
| JP | 8-44393 A | 2/1996 |
| JP | 8-33746 B2 | 3/1996 |
| JP | 8-251031 A | 9/1996 |
| JP | 9-106299 A | 4/1997 |
| JP | 2000-183751 A | 6/2000 |
| JP | 2000-244325 A | 9/2000 |
| JP | 2000-338998 A | 12/2000 |
| JP | 2001-519552 A | 10/2001 |
| WO | WO-99/18673 A1 | 4/1999 |

OTHER PUBLICATIONS

ITU-T Recommendation G.722.1, Proceedings of International Telecommunication Union (1999).

* cited by examiner

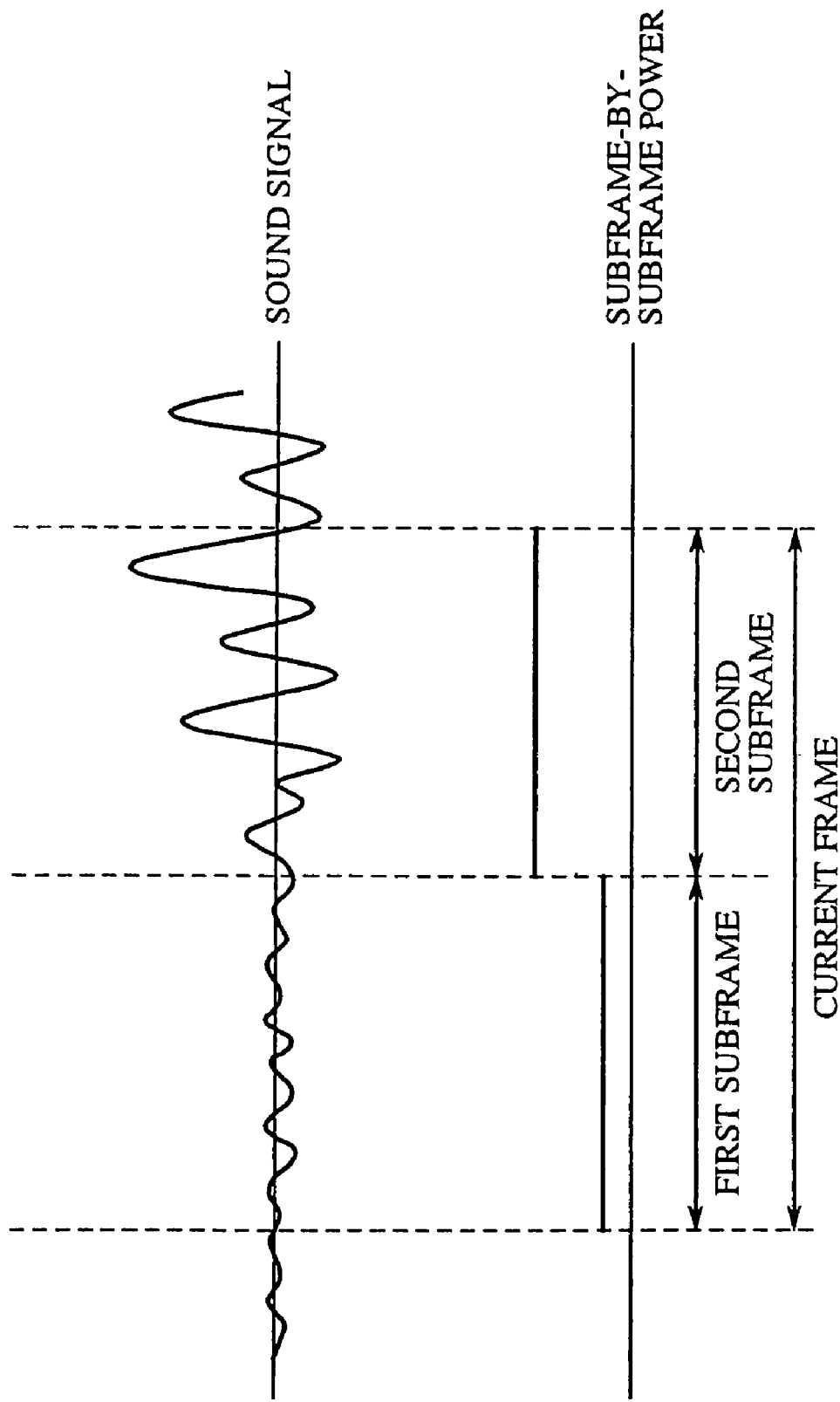

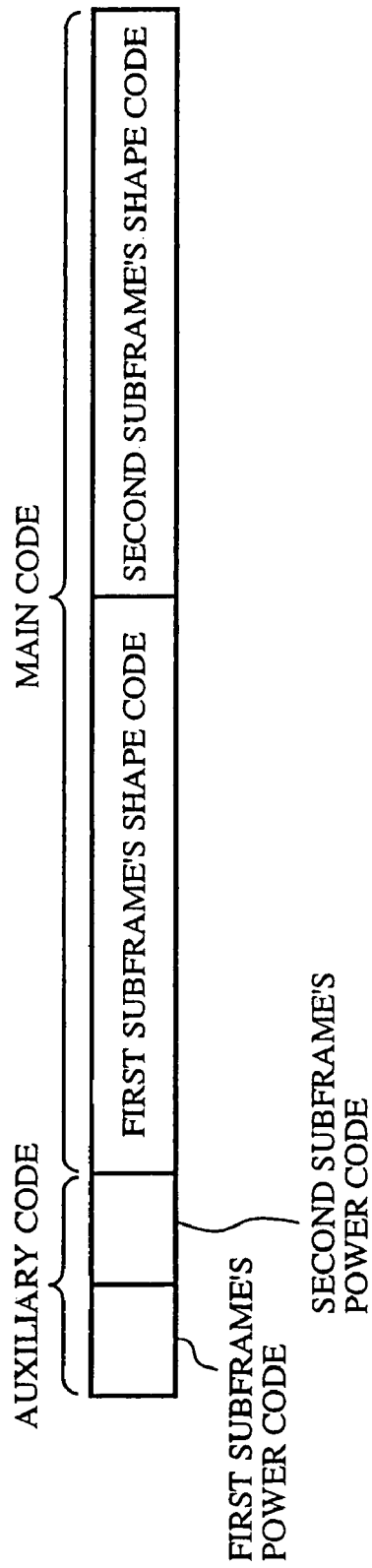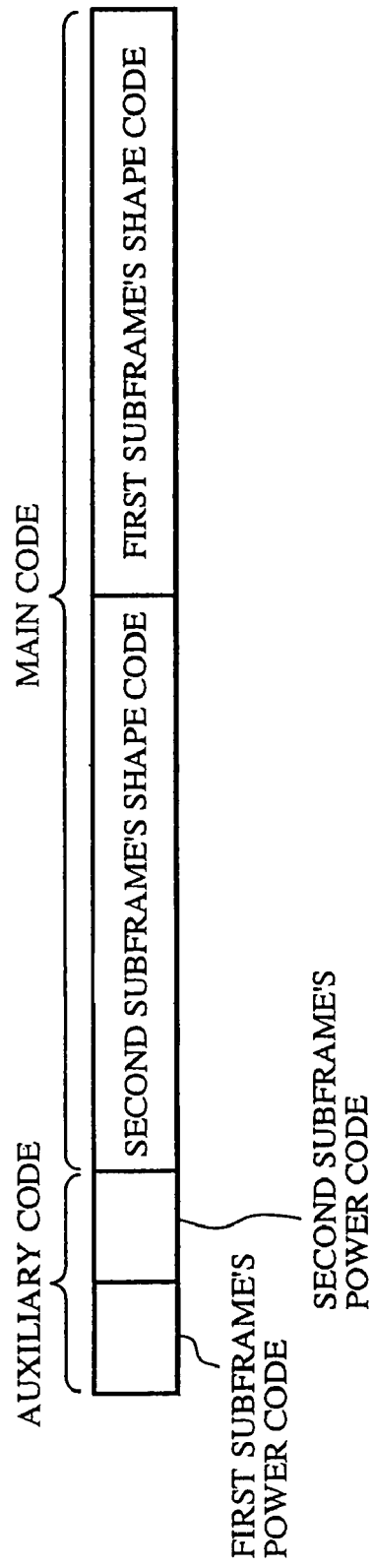

SOUND DECODER AND SOUND DECODING METHOD WITH DEMULTIPLEXING ORDER DETERMINATION

This application is a Divisional of application Ser. No. 11/701,461, filed on Feb. 2, 2007 now abandoned, which is a Divisional of application Ser. No. 10/222,902, filed on Aug. 19, 2002, now U.S. Pat. No. 7,191,126 issued Mar. 13, 2007, which claims priority to Japanese Application No. 2001-266253, filed Sep. 3, 2001, the entire contents of which are hereby incorporated by reference and for which priority is claimed under 35 U.S.C. §120.

BACKGROUND OF THE INVENTION

1. Field of the Invention

The present invention relates to a sound encoder that outputs a sound code acquired by compressing a digital sound signal, such as a musical sound or a voice, into a small volume of information, and a sound decoder that decodes the sound code so as to reproduce a sound signal.

2. Description of the Prior Art

Most prior art sound encoders acquire a plurality of codes having a small volume of information from a sound signal, and multiplex them into a sound code. Most prior art sound decoders demultiplex the sound code into a plurality of codes and decode them so as to reproduce the sound signal.

In a sound encoder and a sound decoder disclosed in "ITU-T Recommendation G.722." (in Sep., 1999), a Huffman code is used as a part of codes in order to reproduce an excellent sound signal even when those codes have a small amount of information. Huffman codes are typical variable length codes having a feature that their code length becomes short when they have a frequently used value and becomes long otherwise.

FIG. 10 is a block diagram showing the structure of a prior art sound encoder as disclosed in the above-mentioned reference, and FIG. 11 is a block diagram showing the structure of a prior art sound decoder as disclosed in the above-mentioned reference. In the FIGS., reference numeral 1 denotes an encoding means for encoding a sound signal, which is the target to be coded, so as to produce and output a plurality of codes (i.e., an envelope code and a plurality of band-by-band codes), and reference numeral 2 denotes a multiplexing unit for multiplexing the plurality of codes output from the encoding means 1 into a multiplexed code and for outputting the multiplexed code as a sound code, reference numeral 3 denotes a demultiplexing means for accepting the sound code from the sound encoder and for demultiplexing the sound code into the plurality of codes (i.e., the envelope code and the plurality of band-by-band codes), and reference numeral 4 denotes a decoding means for decoding the plurality of codes demultiplexed by the demultiplexing means 3 so as to reproduce the sound signal.

Next, a description will be made as to the operation of the prior art sound encoder. The prior art sound encoder performs all processes on a frame-by-frame basis, each frame having a length of 20 ms. When a sound signal is input to the encoding means 1 of the prior art sound encoder, the encoding means 1 performs a modulated lapped transform (MLT) on the sound signal so as to acquire MLT coefficients and divides these MLT coefficients into a plurality of regions. The encoding means 1 then calculates a mean value of the MLT coefficients for each region and encodes an amplitude envelope which consists of a plurality of acquired mean values so as to output the coded amplitude envelope as an envelope code. The encoding means 1 then normalizes the MLT coefficients for each region with a value obtained by decoding the envelope code, quantizes the normalized MLT coefficients for each region, and acquires a fixed length code of length which is fixed for each quantization. The encoding means 1 Huffman-encodes (variable-length encodes) this fixed length code and outputs the acquired variable length code as each band-by-band code. The encoding means 1 further determines and outputs a category code of a fixed length for controlling the quantization stepsize for each region in addition to the envelope code and the plurality of band-by-band codes. However, for simplicity, the detailed explanation of the category code will be omitted hereafter.

When the encoding means 1 outputs the envelope code and the plurality of band-by-band codes, the multiplexing means 2 multiplexes them in a fixed order which is provided in advance and outputs the multiplexed result to the sound decoder as a sound code.

The demultiplexing means 3 of the sound decoder accepts the sound code from the sound encoder and demultiplexes the sound code into a plurality of codes so that they are arranged in the fixed order which is provided in advance and outputs the plurality of codes (i.e., the envelope code and the plurality of band-by-band codes).

When receiving the envelope code and the plurality of band-by-band codes from the demultiplexing means 3, the decoding means 4 decodes the envelope code so as to calculate an amplitude envelope, decodes the plurality of band-by-band codes so as to calculate normalized frequency domain coefficients. By multiplying the value of the amplitude envelope for each region by the normalized frequency domain coefficients for each region, the decoding means 4 denormalize the frequency domain coefficients and performs an Inverse MLT (IMLT) on the denormalized frequency domain coefficients so as to reproduce a sound signal.

FIG. 12 is an explanatory drawing for showing an example of the amplitude envelope generated by the prior art sound encoder. In FIG. 12, the horizontal axis indicates the frequency and the vertical axis indicate the value, i.e., envelope value of the amplitude envelope for each region. The total frequency region of the sound signal which is the target to be coded is divided into fourteen regions, and these fourteen regions starting from the lowest-frequency region are consecutively numbered with numbers in ascending order. The amplitude envelope thus becomes a fourteen-dimensional vector having mean values of the frequency domain coefficients for the fourteen frequency regions as fourteen elements of the vector, and an envelope code is obtained as a result of encoding the amplitude envelope.

FIG. 13 is an explanatory drawing for explaining the structure of the sound code in the case of the amplitude envelope of FIG. 12. The multiplexing means 2 multiplexes the plurality of variable-length codes (i.e., Huffman codes), i.e., the plurality of band-by-band codes respectively provided for the plurality of regions so that the plurality of band-by-band codes are arranged in increasing order of their respective frequencies, after multiplexing the envelope code. When a bit error occurs in the same bit position designated by X as that shown in FIG. 13, the band-by-band code numbered 11 separated by the demultiplexing unit 3 of the sound decoder differs from the original one multiplexed by the sound encoder. Since a Huffman code is used as each of the plurality of band-by-band codes, the code length of the band-by-band code numbered 11 can be erroneously estimated with a considerable probability.

As a result, since the demultiplexing means 3 cannot separate the band-by-band codes numbered 12, 13, and 14, which follows the one numbered 11, from correct locations of the multiplexed code, the following codes separated by the demultiplexing means 15 become erroneous ones. These erroneously decoded regions are hatched in FIGS. 12 and 13. Thus, in the prior art sound encoder and the prior art sound decoder, since band-by-band codes provided for high-frequency regions are often multiplexed fixedly into locations closer to the tail of the multiplexed code, there is a possibility that such band-by-band codes are separated erroneously when an bit error occurs before the locations where they are multiplexed.

Japanese patent application publications No. 9-106299 and 2000-183751 disclose sound encoders and sound decoders different from the above-mentioned prior art example. The prior art sound encoder disclosed in Japanese patent application publication No. 9-106299 encodes only a selected, predetermined number of partial frequency domain coefficients (their respective amplitudes) with a larger value in order to select only the necessary ones from among all samples of frequency domain coefficients into which the sound signal is time-to-frequency domain converted and to encode them with a high degree of efficiency. The encoding of the partial frequency domain coefficients is carried out in such a manner that they are encoded in decreasing order of their values, when encoding the second or later largest coefficient the coefficient encoded immediately before the encoding is decoded, and the second or later largest coefficient is encoded after it is normalized with the decoded coefficient. Information indicating the order in which the partial frequency domain coefficients are to be encoded can be sample numbers which are converted into binary numbers, or a series of sample numbers, which is Huffinan encoded, and is transmitted from the sound encoder to the sound decoder.

The prior art sound encoder disclosed in Japanese patent application publication No. 2000-183751 sorts data to be encoded according to a predetermined reference, such as bits of each data to be encoded, or bit sensitivities determined based on data errors, in order to implement changeable bit rate encoding which is synchronized in real time with traffic (or transmission line congestions). The order of sorting data is predetermined to ensure that the data can be transmitted between the encoding side and the decoding side. In other words, the order of sorting data is so fixed as not to vary from frame to frame.

A problem with such a prior art sound encoder and such a sound decoder constructed as above is that since the order in which a plurality of band-by-band codes which are variable length codes is so fixed as not to vary from frame to frame, erroneous demultiplexing can often occur in band-by-band codes provided for high-frequency regions, which are multiplexed in locations closer to the tail of the multiplexed code. Another problem is that since the deterioration in the tone quality of the sound signal increases when band-by-band codes with a larger envelope value are erroneously separated, the deterioration in the tone quality of the sound signal increases due to the occurrence of bit errors when band-by-band codes provided for high-frequency regions have a larger envelope value. In other words, since the multiplexing is not carried out in consideration of the distribution of bit error sensitivities that varies from frame to frame, the deterioration in the tone quality of the sound signal increases due to the occurrence of bit errors.

The prior art sound encoder and the prior art sound decoder disclosed in Japanese patent application publication No. 9-106299, do not has a method of sufficiently preventing the deterioration in the sound signal due to the occurrence of bit errors by using an error correction code, but only has a modified encoding unit. Japanese patent application publication No. 9-106299 discloses a method of adding a code indicating the order in which partial frequency domain coefficients are to be encoded and encoding it by using a Huffman code. The other codes other than the code indicating the order are fixed length codes and therefore the problem of the occurrence of erroneous demultiplexing caused by the existence of variable length codes cannot be solved. If anything, the deterioration in the sound signal due to the occurrence of bit errors increases because of the addition of the code associated with the order in which partial frequency domain coefficients are to be encoded and the encoding of the second or later largest partial frequency domain coefficient after decoding the immediately-encoded partial frequency domain coefficient and normalizing the second or later largest partial frequency domain coefficient with the decoded value.

A problem with prior art sound encoder and prior art sound decoders as disclosed in Japanese patent application publication No. 2000-183751 is that since the sound encoder does not perform multiplexing that reflects the distribution of bit error sensibilities that varies from frame to frame, but only sorts data to be encoded according to a predetermined reference so that they are arranged in a fixed order that does not vary from frame to frame, the deterioration in the sound signal due to the occurrence of bit errors cannot be sufficiently prevented, as in the case of the prior art sound encoder and the prior art sound decoder as shown in FIGS. 10 and 11.

SUMMARY OF THE INVENTION

The present invention is proposed to solve the above-mentioned problems, and it is therefore an object of the present invention to provide a sound decoding method and a sound decoder having high bit error immunity.

In accordance with an aspect of the present invention, there is provided a sound decoding method: a demultiplexing order determination step for determining an order in which the sound code is to be demultiplexed into main codes part or all of which are variable length codes based on decreasing order of values of amplitude envelope's elements, each value of the amplitude envelope's elements being obtained from one of frequency regions of the amplitude envelope, the amplitude envelope being produced from the auxiliary code as an intermediate variable; and a demultiplexing step for demultiplexing the sound code into the main codes according to the order determined by the demultiplexing order determination step and for outputting the main codes. As a result, the sound decoder can provide high bit error immunity. As a result, the sound decoding method can provide high bit error immunity.

In accordance with another aspect of the present invention, there is provided a sound decoder comprising: a demultiplexing order determination unit for determining an order in which the sound code is to be demultiplexed into main codes part or all of which are variable length codes based on decreasing order of values of amplitude envelope's elements, each value of the amplitude envelope's elements being obtained from one of frequency regions of the amplitude envelope, the amplitude envelope being produced from the auxiliary code as an intermediate variable; and a demultiplexing unit for demultiplexing a sound code into the main codes according to the order determined by the demultiplexing order determination unit and for outputting them. As a result, the sound decoder can provide high bit error immunity.

BRIEF DESCRIPTION OF THE DRAWINGS

FIG. 8 is an explanatory drawing for explaining a power for each subframe in the sound encoder according to embodiment 2 of the present invention;

FIG. 9 is an explanatory drawing for explaining the structure of a sound code output by the sound encoder according to embodiment 2 of the present invention;

DETAILED DESCRIPTION OF THE PREFERRED EMBODIMENTS

The invention will now be described with reference to the accompanying drawings.

Embodiment 1

Figure 1:
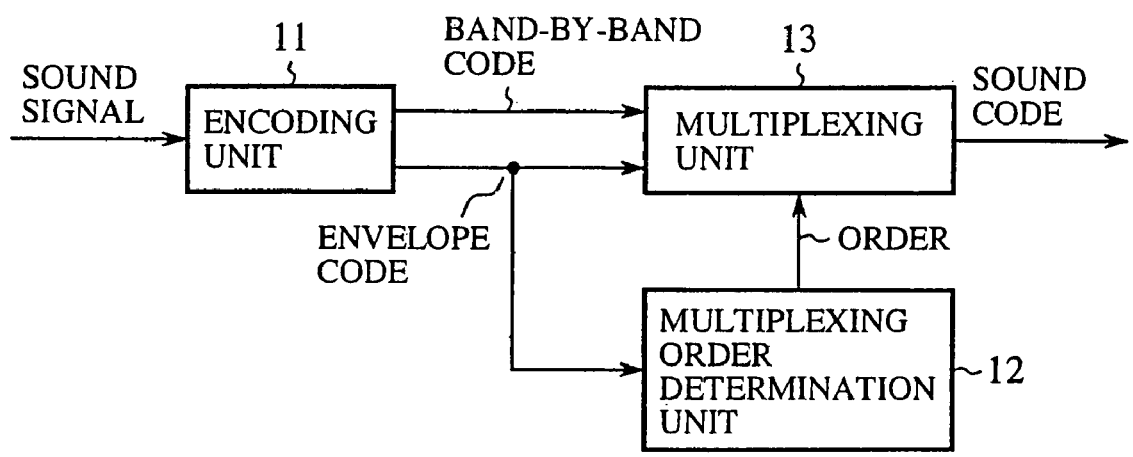
FIG. 1 is a block diagram showing the structure of a sound encoder according to embodiment 1 of the present invention.
Figure 2:
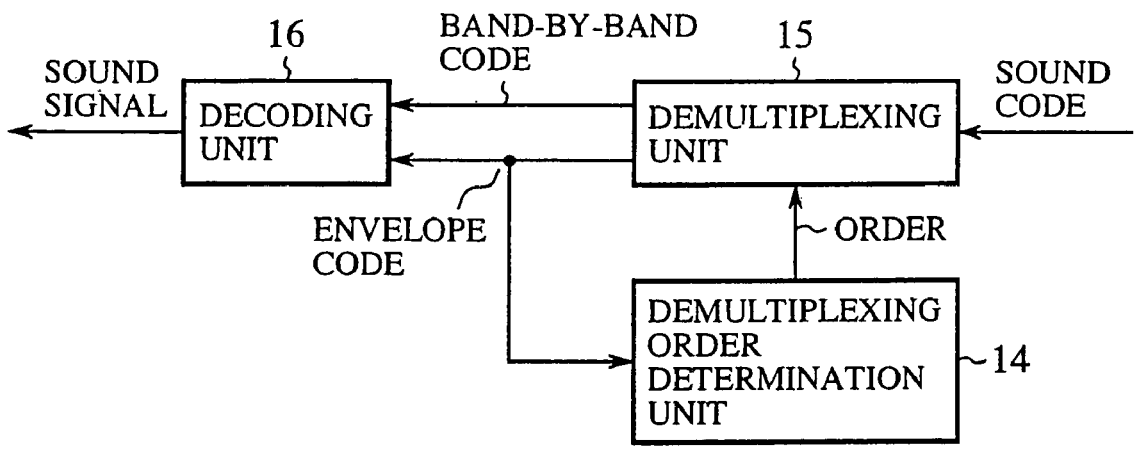
FIG. 2 is a block diagram showing the structure of a sound decoder according to embodiment 1 of the present invention.

FIG. 1 is a block diagram showing the structure of a sound encoder according to embodiment 1 of the present invention, and FIG. 2 is a block diagram showing the structure of a sound decoder according to embodiment 1 of the present invention. In the figure, reference numeral 11 denotes an encoding unit that accepts a sound signal, which is the target to be encoded, for each frame of a predetermined length, and encodes the sound signal so as to produce a plurality of codes, such as an envelope code and a plurality of band-by-band codes, reference numeral 12 denotes a multiplexing order determination unit for determining the order in which the plurality of band-by-band codes are to be multiplexed into a multiplexed code based on the envelope code output from the encoding unit 11, reference numeral 13 denotes a multiplexing unit for multiplexing the envelope code and the plurality of band-by-band codes in the order determined by the multiplexing order determination unit 12, and for outputting the multiplexed result as a sound code, reference numeral 14 denotes a demultiplexing order determination unit for determining the order in which the sound code is to be demultiplexed into a plurality of codes, reference numeral 15 denotes a demultiplexing unit for demultiplexing the sound code into the plurality of codes, such as the envelope code and the plurality of band-by-band codes, one by one in the order determined by the demultiplexing order determination unit 14 and for outputting them, and reference numeral 16 denotes a decoding unit for decoding the envelope code and the plurality of band-by-band codes output from the demultiplexing unit 15 so as to reproduce and output a sound signal.

Next, a description will be made as to the operation of the sound encoder and the operation of the sound decoder in accordance with embodiment 1 of the present invention. The sound encoder performs all processes on a frame-by-frame basis, each frame having a length of 20 ms, for example. When a sound signal is input to the encoding unit 11 of the sound encoder, the encoding unit 11 performs a time to frequency domain transformation, such as a modulated lapped transform (MLT), on the sound signal so as to acquire frequency domain coefficients and divides these frequency domain coefficients into a plurality of portions respectively provided for a plurality of regions. In other words, the plurality of portions which constitute each frame correspond to the plurality of frequency regions into which a frequency spectrum obtained by converting the sound signal from time domain to frequency domain is divided, respectively.

The encoding unit 11 then calculates a mean value of the frequency domain coefficients for each region and encodes an amplitude envelope that consists of a plurality of acquired mean values so as to output the coded amplitude envelope as an envelope code. The encoding unit 11 then normalizes the frequency domain coefficients for each region with a value obtained by decoding the envelope code, quantizes the normalized frequency domain coefficients for each region, and acquires a fixed length code of length which is fixed for each quantization. The encoding unit 11 Huffman-encodes (variable-length encodes) this fixed length code and outputs the acquired variable length code as each band-by-band code. The encoding unit 11 can further determine and output a category control code of a fixed length for controlling the quantization stepsize for each region in addition to the envelope code and the plurality of band-by-band codes, and can multiplex the category control code as well as the envelope code and the plurality of band-by-band codes into a multiplexed code.

When receiving the plurality of codes from the encoding unit 11, the multiplexing order determination unit 12 classifies the plurality of band-by-band codes as main codes and classifies the remaining envelope code as an auxiliary code. The multiplexing order determination unit 12 then determines the order in which the plurality of band-by-band codes, which are main codes, are to be multiplexed into the multiplexed code based on the envelope code which is an auxiliary code.

Concretely, the multiplexing order determination unit 12 determines the order in the following manner. While keeping the order in which the envelope code, which is an auxiliary code, is to be multiplexed into the multiplexed code fixed so that it does not vary from frame to frame, the multiplexing order determination unit 12 determines the order in which the plurality of band-by-band codes, which are main codes, are to be multiplexed into the multiplexed code in the order of the values of the amplitude envelope's elements obtained by decoding the envelope code, for example. Since the amplitude envelope is calculated as an intermediate variable in the encoding unit 11, it is possible to omit the decoding of the amplitude envelope in the multiplexing order determination unit 12 by delivering the amplitude envelope from the encoding unit 11 to the multiplexing order determination unit 12. The order does not simply indicate the order in which processes are to be done with time, but indicates where the plurality of codes are to be placed in the sound code into which they are to be multiplexed by the multiplexing unit 13.

When receiving the plurality of codes from the encoding unit 11, the multiplexing unit 13 multiplexes the envelope code and the plurality of band-by-band codes in the order determined by the multiplexing order determination unit 12 and then outputs the multiplexed result as a sound code.

When receiving the sound code from the sound encoder, the demultiplexing unit 15 of the sound decoder separates only the auxiliary code, i.e., the envelope code from the sound code, and then outputs it. The demultiplexing unit 14 can separate only the auxiliary code without having to wait for inputting of the order determined on a frame-by-frame basis because the order in which the auxiliary code is multiplexed into the received multiplexed code is fixed in the multiplexing order determination unit 12 of the corresponding sound encoder.

When receiving the envelope code which is an auxiliary code from the demultiplexing unit 15, the demultiplexing order determination unit 14 determines the order in which the plurality of main codes are to be separated by the demultiplexing unit 15 based on the envelope code. The method of determining the order has to be made to be the same as that used by the multiplexing order determination unit 12 of the corresponding sound encoder. When the amplitude envelope can be calculated prior to the processing done by the demultiplexing order determination unit 14 within the decoding unit 16, it is possible to omit the decoding of the envelope code in the demultiplexing order determination unit 14 by delivering the amplitude envelope from the decoding unit 16 to the demultiplexing order determination unit 15.

The demultiplexing unit 15 separates the plurality of main codes, i.e., the plurality of band-by-band codes from the sound code in the order determined by the demultiplexing order determination unit 14 and then outputs them. When receiving the envelope code and the plurality of band-by-band codes from the demultiplexing unit 15, the decoding unit 16 decodes the envelope code so as to calculate the amplitude envelope and decodes the plurality of band-by-band codes so as to calculate the normalized frequency domain coefficients. The demultiplexing unit 15 then denormalizes the frequency domain coefficients by multiplying the value of the amplitude envelope for each region by the normalized frequency domain coefficients for each region, and performs a frequency to time domain transformation, such as an Inverse MLT (IMLT), on the denormalized frequency domain coefficients for each region so as to reproduce a sound signal.

Figure 3:
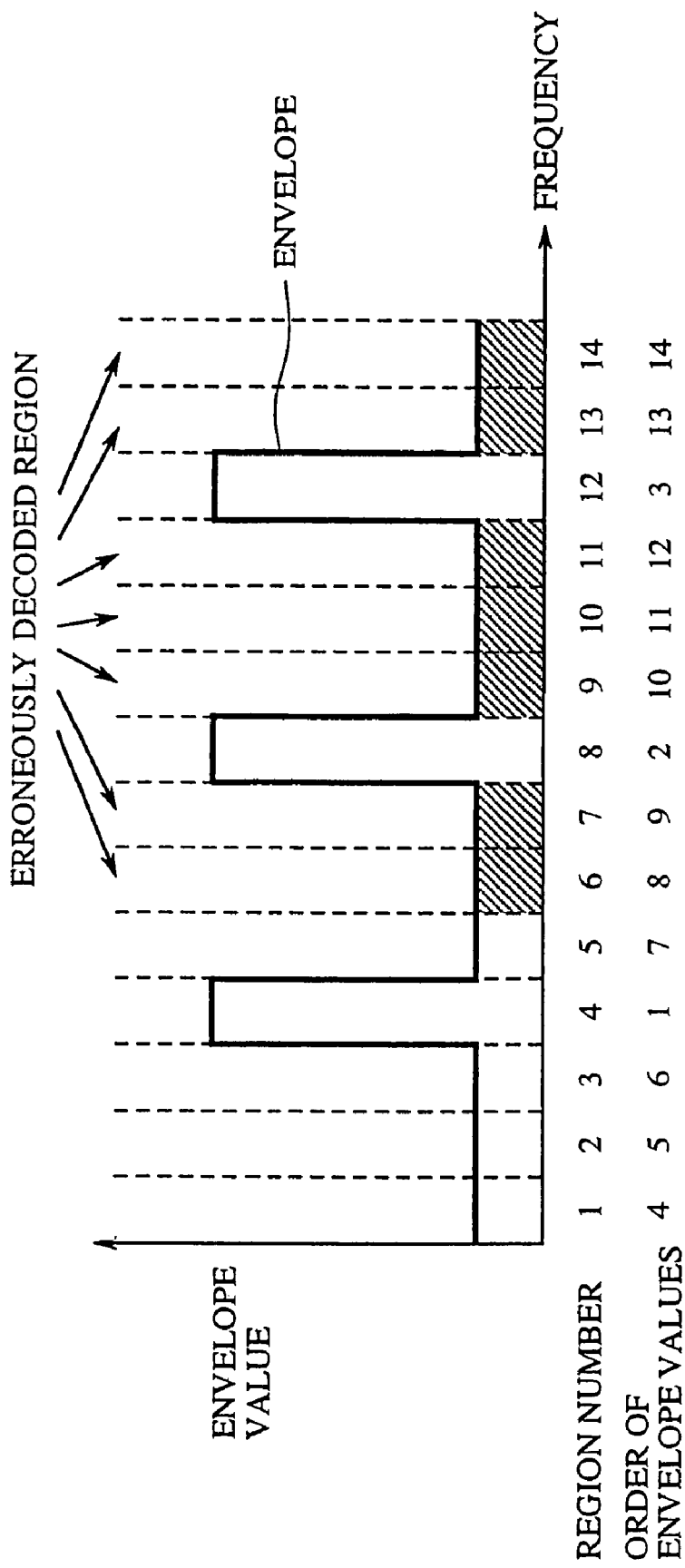
FIG. 3 is an explanatory drawing for showing an example of an amplitude envelope calculated by the sound encoder according to embodiment 1 of the present invention.
Figure 12:
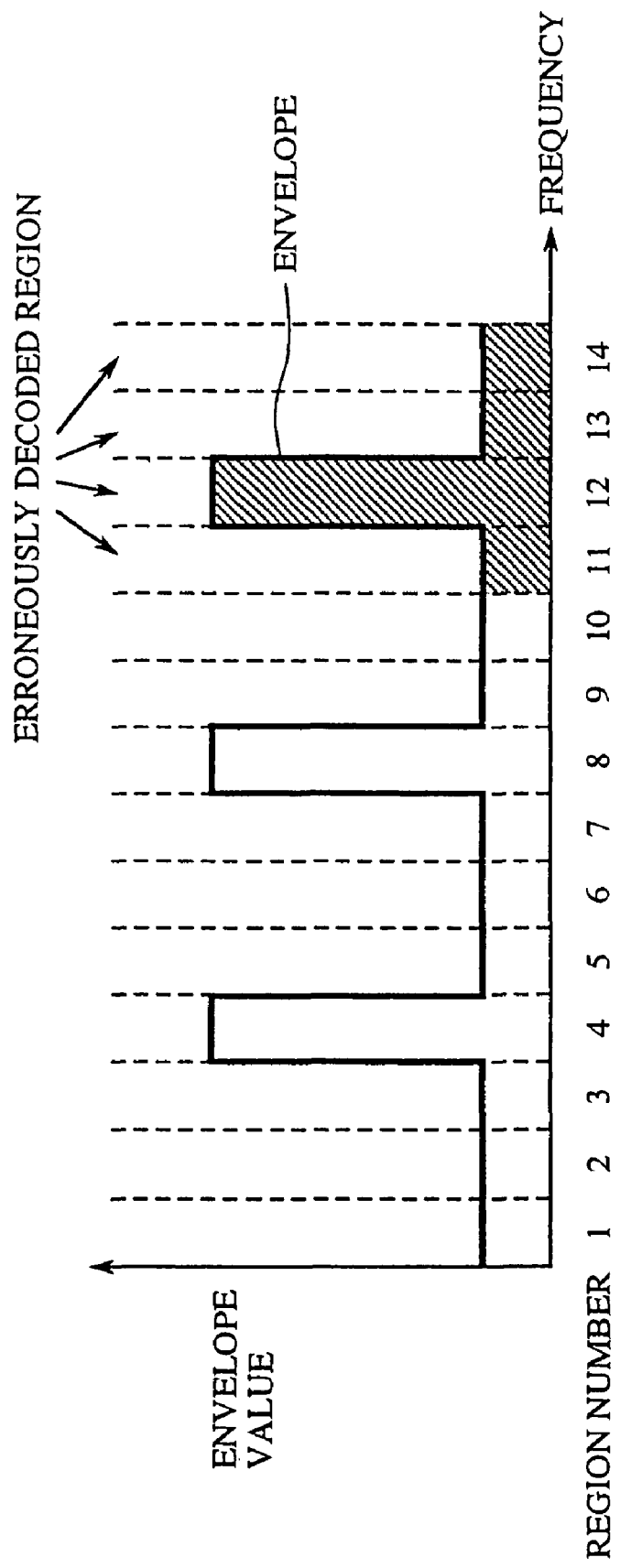
FIG. 12 is an explanatory drawing for showing an example of an amplitude envelope calculated by the prior art sound encoder.

FIG. 3 is an explanatory drawing for showing an example of the amplitude envelope calculated by the sound encoder. In FIG. 3, the horizontal axis indicates the frequency and the vertical axis indicates the value, i.e., the envelope value of each element of the amplitude envelope for each region. The total frequency region of the sound signal which is the target to be encoded is divided into fourteen regions, and these fourteen regions starting from the lowest-frequency region are consecutively numbered with numbers in ascending order. The amplitude envelope is a fourteen-dimensional vector having mean values of the fourteen portions of the frequency domain coefficients for the fourteen frequency regions as fourteen elements of the vector, and the envelope code is obtained as a result of encoding the amplitude envelope. The amplitude envelope shown in FIG. 3 has the same envelope values as those as shown in FIG. 12.

In the case of the amplitude envelope of FIG. 3, the regions numbered 4, 8, and 12 have a larger envelope value than the other regions, and the order of the envelope values is as shown in the lowest part of FIG. 3. Each of the multiplexing order determination unit 12 and the demultiplexing order determination unit 14 decodes the input envelope code so as to calculate the order of the envelope values for the acquired amplitude envelope on a frame-by-frame basis.

Figure 4:
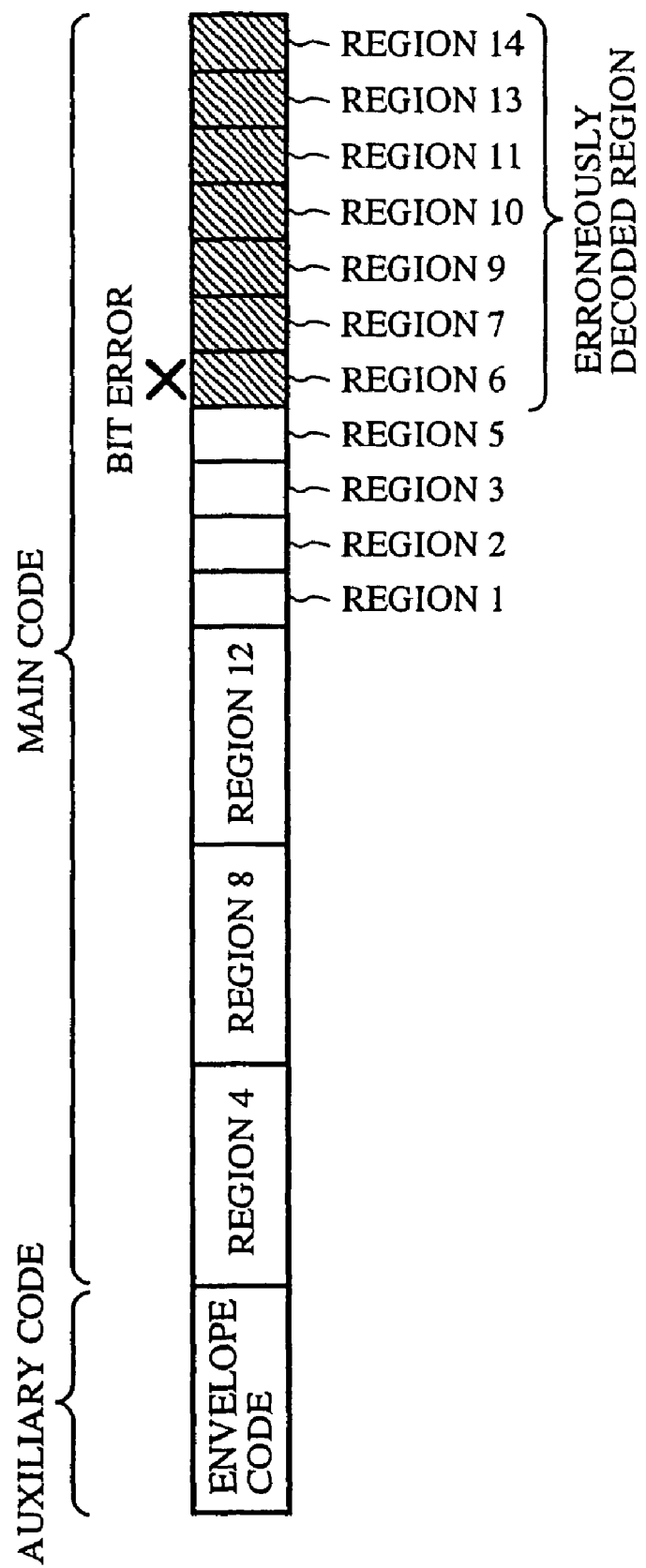
FIG. 4 is explanatory drawing for explaining the structure of a sound code to in the case of the amplitude envelope of FIG. 3.

FIG. 4 is an explanatory drawing for explaining the structure of the sound code in the case of the amplitude envelope of FIG. 3. The multiplexing unit 13 multiplexes the envelope code into the head of the multiplexed code, and multiplexes the plurality of variable length codes, which are provided for the plurality of regions, respectively, i.e., the plurality of band-by-band codes into the multiplexed code in the above-mentioned order of the plurality of corresponding envelope values calculated on a frame-by-frame basis. Concretely, the multiplexing unit 13 multiplexes the band-by-band code numbered 4 and having the first order of envelope value, i.e., having the largest envelope value into an area of the multiplexed code next to the area in which the envelope code is placed. The multiplexing unit 13 then multiplexes the band-by-band code numbered 8 and having the second order of envelope value, i.e., having the second largest envelope value into an area of the multiplexed code next to the area in which the band-by-band code numbered 4 is placed. The multiplexing unit 13 repeatedly and sequentially multiplexes up to the band-by-band code numbered 14 and having the fourteenth order of envelope value, i.e., having the smallest envelope value. It is apparent from the comparison with the prior art sound code shown in FIG. 13 that the order in which the plurality of band-by-band codes are to be multiplexed differs from that of FIG. 13.

Figure 13:
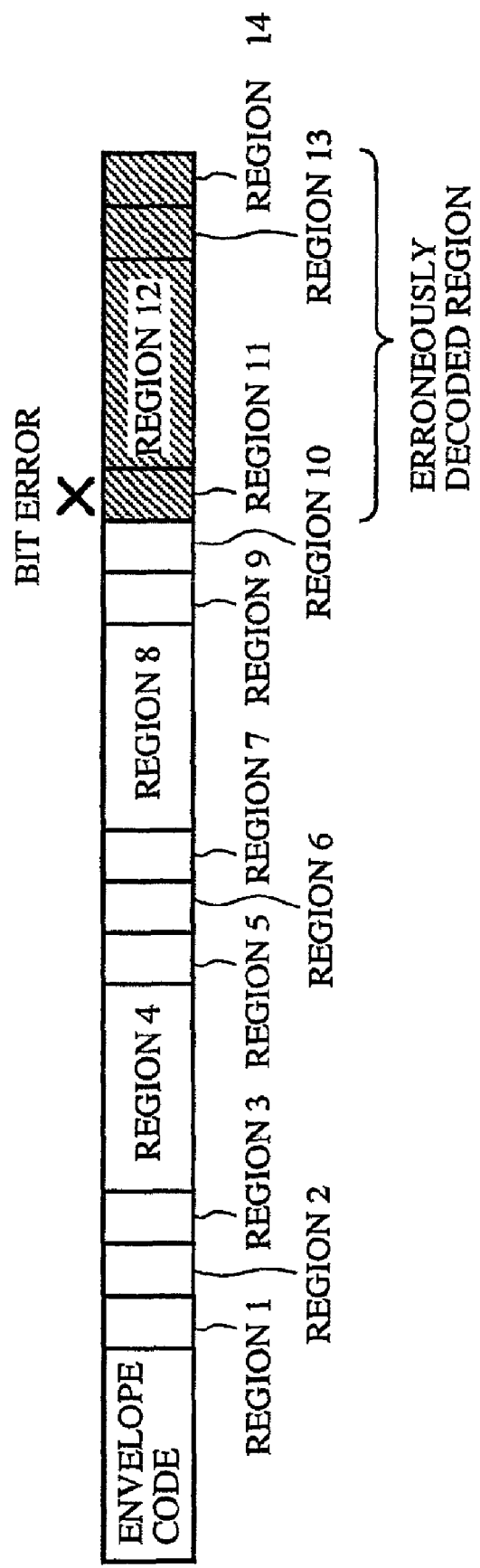
FIG. 13 is an explanatory drawing for explaining the structure of the sound code in the case of the amplitude envelope of FIG. 12.

When a bit error occurs in the same bit position designated by X as that shown in FIG. 13, the band-by-band code numbered 6 separated by the demultiplexing unit 15 of the sound decoder differs from the original one multiplexed by the sound encoder. Since a Huffman code is used as each of the plurality of band-by-band codes, the code length of the band-by-band code numbered 6 can be erroneously estimated with a considerable probability. As a result, since the demultiplexing unit 15 cannot separate the band-by-band codes numbered 7, 9, 10, 11, 13, and 14, which follow the one numbered 6, from correct areas of the multiplexed code, these following codes separated by the demultiplexing unit 15 become erroneous ones. Those erroneously decoded regions are hatched in FIGS. 3 and 4.

It is apparent from the comparison between the erroneously decoded regions shown in FIG. 3 and those shown in FIG. 13 that the band-by-band code numbered 12 associated with a region having a large envelope value is not decoded erroneously, while the number of band-by-band codes decoded erroneously and associated with regions having a small envelope value increases. Since the tone quality of the reproduced sound signal deteriorates when one band-by-band code associated with a region having a large envelope value, i.e., a large power is erroneously decoded, the deterioration in the tone quality decreases as compared with above-mentioned prior art examples. Thus, the present embodiment makes it possible to lower the probability of erroneously decoding band-by-band codes associated with regions which are determined to exert a large influence of errors (i.e., regions having a large envelope value in this case) by multiplexing those band-by-band codes into the multiplexed code so that they are arranged in areas closer to the head of the multiplexed code, thereby reducing the deterioration in the tone quality of the sound signal.

Figure 5:
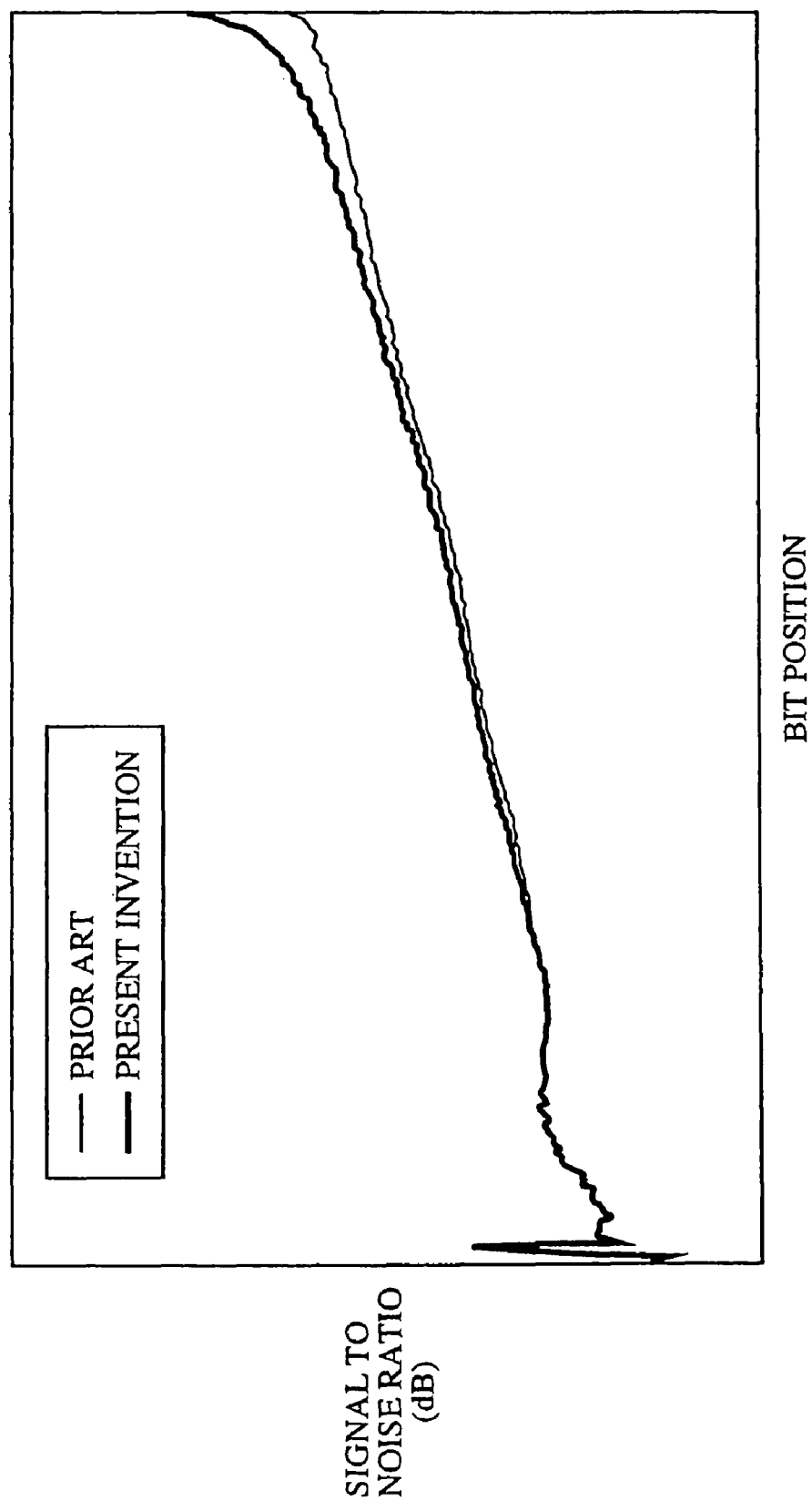
FIG. 5 is an explanatory drawing for showing an evaluation result of bit error sensibility when a voice is input as the sound signal.

FIG. 5 shows results of an evaluation of bit error sensibilities when a voice is input as the sound signal. In the figure, the horizontal axis indicates the position of each bit of the sound code, and the leftmost end of the axis corresponds to the head bit of the sound code and the rightmost end of the axis corresponds to the tail bit of the sound code. When the sound signal output from the sound decoder when a bit error occurs in each bit of the sound code is x (t) and the sound signal output from the sound decoder when no bit error occurs is s (t), and the vertical axis indicates the signal to noise ratio SNR, the signal to noise ratio SNR is given by the following equation:

1 $SNR=\log s(t)2(s(t)-x(t))2$

The larger the signal to noise ratio, the less the deterioration in the tone quality in FIG. 5. It is apparent from the comparison with above-mentioned prior art examples, as shown in FIG. 5, that the structure of this embodiment 1 makes the signal to noise ratio SNR of the sound signal larger, thereby reducing the deterioration in the tone quality of the sound signal due to the occurrence of bit errors. Furthermore, it is understood that even when the sound code is partially protected by using an error correction code an improvement can be effected in the remaining region not protected, because the improvement is effected in most of the bit positions of the sound code.

In this embodiment 1, only the envelope code is used as an auxiliary code to determine the order in which the plurality of input codes are to be multiplexed into the multiplexed code and the multiplexed code is to be demultiplexed into a plurality of output codes. The present invention is not limited to this case, and various variants can be made. For example, a category control code for controlling the quantization stepsize can be multiplexed into the multiplexed code and the order in which the plurality of input codes are to be multiplexed into the multiplexed code can be modified according to the category control code. Furthermore, in this embodiment 1, the order of the values of the amplitude envelope's elements obtained by decoding the envelope code is used unchanged as the order in which the plurality of input codes are to be multiplexed into the multiplexed code. As an alternative, it is possible to determine the order in which the plurality of input codes are to be multiplexed into the multiplexed code based on the order of the values of the amplitude envelope's elements obtained by decoding the envelope code by taking the fact that the human audibility varies from frequency to frequency into consideration. It is also possible to fixedly multiplex several band-by-band codes for regions with a lower frequency into the multiplexed code prior to the multiplexing of any other codes.

As can be seen from the above description, in accordance with this embodiment 1, since the sound encoder is so constructed as to multiplex a plurality of codes into a sound code in the order determined by the multiplexing order determination unit 12 and the sound decoder is so constructed as to demultiplex the plurality of codes from the sound code one by one in the order determined by the demultiplexing order determination unit 14, the present embodiment makes it possible to adaptively multiplex a code that exerts a large influence upon other codes or a part of the code into a position of the sound code where there is a low possibility that the code or the part of the code is erroneously decoded. In other words, the present embodiment makes it possible to implement multiplexing and demultiplexing that reflect the distribution of bit error sensibilities which varies from frame to frame. As a result, the present embodiment offers an advantage of being able to provide a sound encoder and a sound decoder having high bit error immunity.

Embodiment 2

Figure 6:
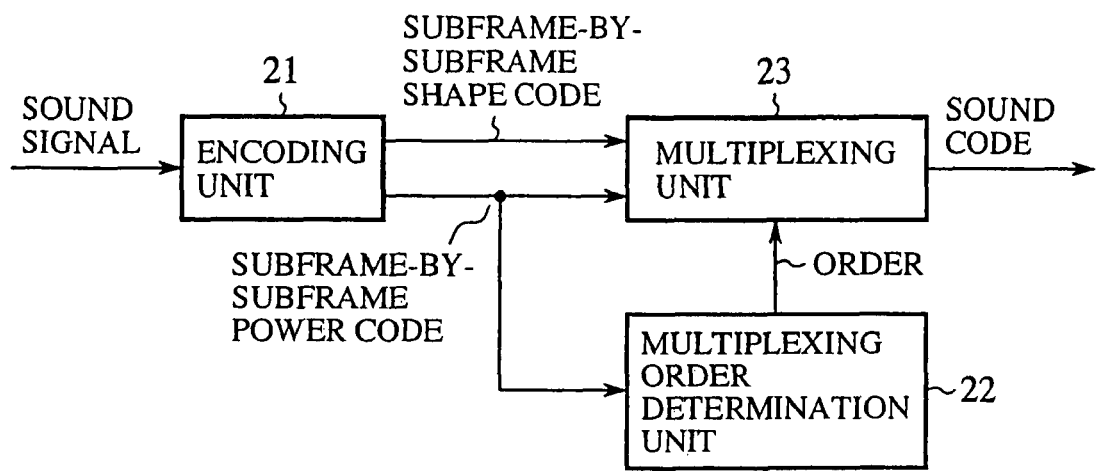
FIG. 6 is a block diagram showing the structure of a sound encoder according to embodiment 2 of the present invention.
Figure 7:
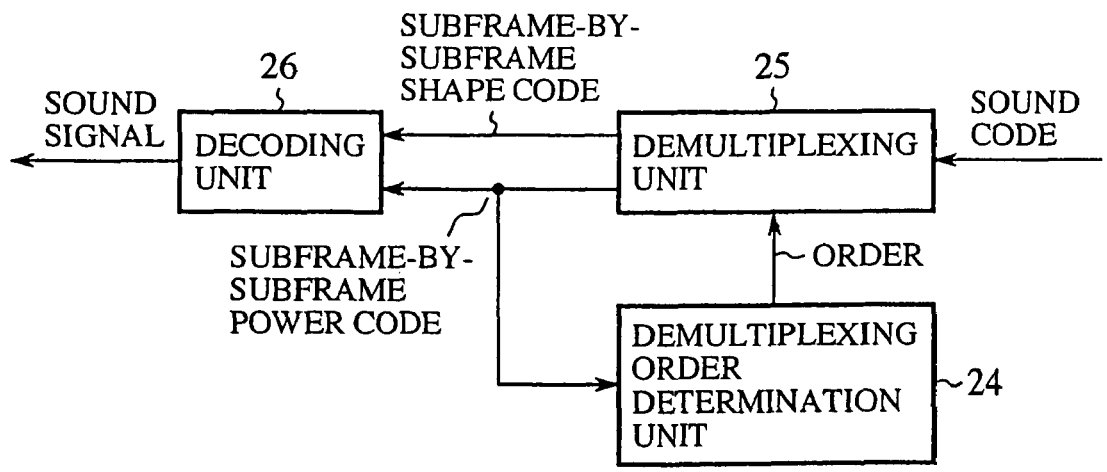
FIG. 7 is a block diagram showing the structure of a sound decoder according to embodiment 2 of the present invention.
Figure 10:
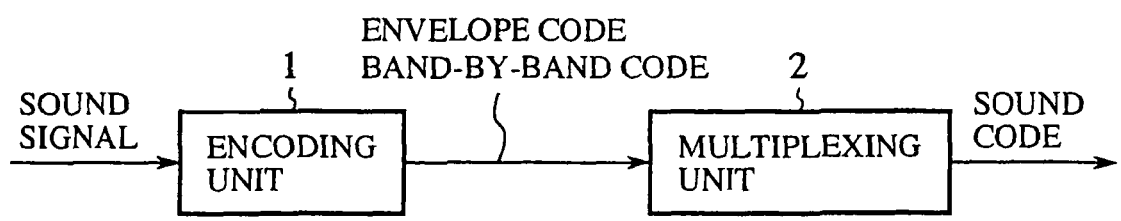
FIG. 10 is a block diagram showing the structure of a prior art sound encoder.
Figure 11:
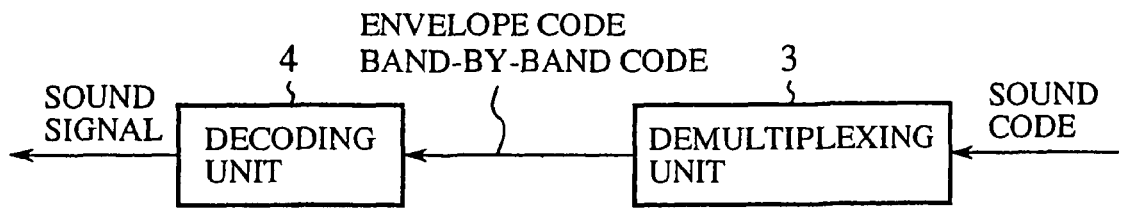
FIG. 11 is a block diagram showing the structure of a prior art sound decoder.

FIG. 6 is a block diagram showing the structure of a sound encoder according to embodiment 2 of the present invention, and FIG. 7 is a block diagram showing the structure of a sound decoder according to embodiment 2 of the present invention. In the figure, reference numeral 21 denotes an encoding unit for accepting a sound signal which is the target to be coded, for each frame of a predetermined length, and for encoding the sound signal so as to produce a plurality of codes (a plurality of subframe-by-subframe power codes and a plurality of subframe-by-subframe shape codes, which are respectively provided for a plurality of subframes), reference numeral 22 denotes a multiplexing order determination unit for determining the order in which the plurality of shape codes are to be multiplexed into a multiplexed code, based on the plurality of subframe-by-subframe power codes output from the encoding unit 21, reference numeral 23 denotes a multiplexing unit for multiplexing the plurality of subframe-by-subframe shape codes and the plurality of subframe-by-subframe power codes into the multiplexed code in the order determined by the multiplexing order determination unit 22, and for outputting the multiplexed result as a sound code, reference numeral 24 denotes a demultiplexing order determination unit for determining the order in which the sound code is to be demultiplexed into a plurality of codes, reference numeral 25 denotes a demultiplexing unit for demultiplexing the sound code into the plurality of codes (i.e., the plurality of subframe-by-subframe power codes and the plurality of subframe-by-subframe shape codes) one by one in the order determined by the demultiplexing order determination unit 24 so as to output them, and reference numeral 26 denotes a decoding unit for decoding the plurality of subframe-by-subframe power codes and the plurality of subframe-by-subframe shape codes respectively, which are output from the demultiplexing unit 25, so as to reproduce and output a sound signal.

Next, a description will be made as to the operation of the sound encoder and the operation of the sound decoder. The sound encoder performs all processes on a frame-by-frame basis, each frame having a length of 20 ms, for example. When the encoding unit 21 of the sound encoder accepts a sound signal, the encoding unit 21 encodes the sound signal for each of two subframes (i.e., sections) into which each frame of the sound signal is divided. For each of the two subframes, the encoding unit 21 acquires a power of a signal in each of the two subframes and then encodes the power so as to produce a power code. The encoding unit 21 then normalizes the sound signal in each of the two subframes with a value obtained by decoding the power code, and encodes the normalized sound signal so as to produce a shape code. The encoding unit 21 thus performs this encoding processing on each of the two subframes so as to produce and output two power codes, as subframe-by-subframe power codes, and two shape codes, as subframe-by-subframe shape codes.

All or part of each of the two shape codes is a variable length code such as a Huffinan code. An envelope code and a plurality of band-by-band codes, which are explained in above-mentioned embodiment 1, can be used as each of the shape codes. Each of the shape codes is not limited to a combination of an envelope code and a plurality of band-by-band codes, and one of various combinations of a spectrum code, an adaptive sound source code, a driving sound source code, and a gain code widely used in sound coding can be used as each of the shape codes.

When the multiplexing order determination unit 22 receives the plurality of codes from the encoding unit 21, it classifies the plurality of subframe-by-subframe shape codes as main codes and classifies the plurality of subframe-by-subframe power codes as auxiliary codes. The multiplexing order determination unit 22 then determines the order in which the plurality of subframe-by-subframe shape codes, which are main codes, are to be multiplexed into a sound code based on the plurality of subframe-by-subframe power codes which are auxiliary codes. The order does not simply indicate the order in which processes are to be done with time, but indicates where the plurality of codes are to be placed in the sound code into which they are to be multiplexed by the multiplexing unit 23. Concretely, the multiplexing order determination unit 22 provides a frame-independent fixed order for multiplexing of the plurality of subframe-by-subframe power codes which are auxiliary codes, and determines only the order, in which the main codes are to be multiplexed into the sound code, on a frame-by-frame basis. For example, the multiplexing order determination unit 22 determines the order, in which the main codes are to be multiplexed into the sound code, according to the comparison between the subframe-by-subframe powers acquired by decoding the plurality of subframe-by-subframe power codes which are auxiliary codes. Since the subframe-by-subframe powers are calculated as intermediate variables in the encoding unit 21, the encoding unit 21 can deliver the subframe-by-subframe powers to the multiplexing order determination unit 22 and it is therefore to omit the decoding of the subframe-by-subframe power codes in the multiplexing order determination unit 22.

When receiving the plurality of codes from the encoding unit 21, the multiplexing unit 23 multiplexes both the subframe-by-subframe power codes and the subframe-by-subframe shape codes into a multiplexed code in the order determined by the multiplexing order determination unit 22, and outputs the multiplexed result as a sound code.

When receiving the sound code from the sound encoder, the demultiplexing unit 25 of the sound decoder demultiplexes only the auxiliary codes included in the sound code, i.e., the subframe-by-subframe power codes and then outputs them. The demultiplexing unit 25 can separate only the auxiliary codes without having to wait for inputting of the order determined on a frame-by-frame basis because the order in which the auxiliary codes are to be multiplexed into the received multiplexed code is fixed in the multiplexing order determination unit 22 of the corresponding sound encoder.

When receiving the subframe-by-subframe power codes which are auxiliary codes from the demultiplexing unit 25, the demultiplexing order determination unit 24 determines the order in which the main codes are to be demultiplexed by the demultiplexing unit 25 based on the subframe-by-subframe power codes. The method of determining the order has to be made to be the same as that used by the multiplexing order determination unit 22 of the corresponding sound encoder. When the power for each subframe can be calculated prior to the processing done by the demultiplexing order determination unit 24 within the decoding unit 26, it is possible to omit the decoding of the subframe-by-subframe power codes in the demultiplexing order determination unit 24 by delivering the power for each subframe from the decoding unit 26 to the demultiplexing order determination unit 24.

The demultiplexing unit 25 separates the main codes included in the sound code, i.e., the subframe-by-subframe shape codes from the sound code in the order determined by the demultiplexing order determination unit 24 and outputs them. When the decoding unit 26 receives the subframe-by-subframe power codes and the subframe-by-subframe shape codes from the demultiplexing unit 25, it decodes the subframe-by-subframe power codes so as to calculate the subframe-by-subframe powers and produces normalized sound signals for the two subframes from the subframe-by-subframe shape codes, respectively. The decoding unit 26 then denormalizes the sound signals by multiplying the subframe-by-subframe powers by the normalized sound signals for the two subframes, respectively, and outputs the combination of the two denormalized sound signals as a sound signal.

FIG. 8 is an explanatory drawing for explaining the subframe-by-subframe powers produced in the sound encoder. In FIG. 8, the horizontal axis indicates the time and it is assumed that the current frame is divided into two subframes: the first half which is referred to as the first subframe and the latter half which is referred to as the second subframe. In the figure, the sound signal for the current frame is shown in the upper part and the subframe-by-subframe powers (i.e., values obtained by decoding the subframe-by-subframe power codes) calculated for the sound signal are shown in the lower part. In the case of the sound signal of FIG. 8, the second subframe has a larger power than the first subframe.

FIGS. 9A and 9B are explanatory drawings for explaining the structure of the sound code output by the sound encoder. FIG. 9A shows an example of the sound code in which the first subframe has a power equal to or greater than that of the second subframe, and FIG. 9B shows another example of the sound code in which the first subframe has a power less than that of the second subframe, as in the case of FIG. 8. As shown in FIGS. 9A and 9B, the subframe-by-subframe power codes which are auxiliary codes are fixedly multiplexed into the head of the sound code regardless of the difference between the power of the first subframe and that of the second subframe. The demultiplexing order determination unit 24 compares the power of the first subframe with that of the second subframe, and gives a higher priority to one of the subframe-by-subframe shape codes, which is associated with the subframe that provides a larger power, so that the higher-priority subframe-by-subframe shape code is multiplexed into the sound code before the other shape code is multiplexed.

In general, each shape code is the one into which a plurality of codes are multiplexed. Since a variable length code is used as part or all of each shape code, the code length of each shape code can be erroneously estimated when a bit error occurs. As a result, the demultiplexing unit may separate other codes, which are placed behind a shape code at which a bit error occurs, erroneously. Therefore, as the demultiplexing unit reaches the tail of the sound code, codes can be decoded erroneously with a higher probability because of the occurrence of bit errors. As shown in FIGS. 9A and 9B, the multiplexing unit of this embodiment 2 multiplexes one subframe-by-subframe shape code with a larger power before multiplexing the other subframe-by-subframe shape code, thereby reducing the probability of erroneously decoding the former subframe-by-subframe shape code with a larger power. In general, since the deterioration in the tone quality of the sound signal is large when a subframe-by-subframe shape code with a larger power is erroneously decoded, the multiplexing as shown in FIGS. 9A and 9B makes it possible to reduce the deterioration in the tone quality of the sound signal by reducing the probability of erroneously decoding a subframe-by-subframe shape code with a larger power.

In this embodiment 2, the number of subframes included in each frame is 2, but is not limited to 2. As an alternative, the number of subframes included in each frame can be 3 or more. Furthermore, in this embodiment 2, the multiplexing unit of the sound encoder multiplexes the two power codes respectively provided for the two subframes of each frame into a sound code. As an alternative, the multiplexing unit can vector quantize the two subframe-by-subframe powers as a single unit and encode the vector quantized result so as to produce a power code on a frame-by-frame basis. Furthermore, instead of controlling the order in which the first subframe's shape code and the second subframe's shape code are to be multiplexed into the sound code, the multiplexing unit of the sound encoder can multiplex a part of each shape code into the sound code in a fixed order so that it is placed immediately behind the two power codes, and can control the order in which the remainder of the first subframe's shape code and the remainder of the second subframe's shape code are to be multiplexed according to the subframe-by-subframe powers. As an alternative, the multiplexing unit of the sound encoder can divide the shape code of each subframe into a plurality of portions, and can finely control the order in which the plurality of portions are to be multiplexed according to a plurality of powers respectively provided for them. In addition, in accordance with this embodiment 2, only the two power codes can be used, as auxiliary codes, to determine the order in which the first subframe's shape code and the second subframe's shape code are to be multiplexed into the sound code. The present embodiment is not limited to the case, and any other code can be used, as an auxiliary code, if the importance of each subframe is determined using the other code. In this variant, the combination of the other code and the two power codes are used as auxiliary codes, or only the other code is used as an auxiliary code.

As can be seen from the above description, in accordance with this embodiment 2, the sound encoder is so constructed as to multiplex a plurality of codes into a sound code in the order determined by the multiplexing order determination unit 22, and the sound decoder is so constructed as to demultiplex the sound code into the plurality of codes one by one in the order determined by the demultiplexing order determination unit 24 and to output them. The present embodiment therefore makes it possible to adaptively multiplex a code that exerts a large influence upon other codes or a part of the code into a position of the sound code where there is a low possibility that the code or the part of the code is erroneously decoded. In other words, the present embodiment makes it possible to implement multiplexing and demultiplexing that reflect the distribution of bit error sensibilities which varies from frame to frame. As a result, the present embodiment offers an advantage of being able to provide a sound encoder and a sound decoder having high bit error immunity.

Embodiment 3

In a sound encoder according to a variant of either of the first to second embodiments, the multiplexing unit can interchange a plurality of codes multiplexed into a multiplexed code based on the order determined by the multiplexing order determination unit after multiplexing the plurality of codes into the multiplexed code in a fixed order once, instead of multiplexing the plurality of codes into the multiplexed code in the determined order. Even in this case, the same advantages are provided. Similarly, in a sound decoder according to a variant of either of the first to second embodiments, the demultiplexing unit can demultiplex an input multiplexed code into a plurality of codes in a fixed order after interchanging the plurality of codes multiplexed into the multiplexed code based on the order determined by the demultiplexing order determination unit once, instead of demultiplexing the multiplexed code into the plurality of codes in the determined order. Even in this case, the same advantages are provided.

Many widely different embodiments of the present invention may be constructed without departing from the spirit and scope of the present invention. It should be understood that the present invention is not limited to the specific embodiments described in the specification, except as defined in the appended claims.

What is claimed is:

1. A sound decoder comprising:
   a demultiplexing unit that performs a first demultiplexing operation by receiving a sound code on a frame-by-frame basis and demultiplexing the sound code into an auxiliary code which is multiplexed for each frame in a same fixed order;
   a demultiplexing order determination unit for determining an order in which the sound code is to be demultiplexed into main codes, part or all of which are variable length codes, based on decreasing order of the values of an amplitude envelope's elements, each value of the amplitude envelope's elements being obtained from one of frequency regions of the amplitude envelope, the amplitude envelope being produced from the auxiliary code as an intermediate variable;
   the demultiplexing unit performing a second demultiplexing operation by demultiplexing the sound code into the main codes according to the order determined by said demultiplexing order determination unit and outputting the main codes; and
   a decoding unit for decoding the main codes output from said demultiplexing unit so as to reproduce a sound signal.

2. A sound decoding method comprising:
   a first demultiplexing step for receiving a sound code on a frame-by-frame basis, and for demultiplexing the sound code into an auxiliary code which is multiplexed for each frame in a same fixed order;
   a demultiplexing order determination step for determining an order in which the sound code is to be demultiplexed into main codes, part or all of which are variable length codes, based on decreasing order of values of amplitude envelope's elements, each value of the amplitude envelope's elements being obtained from one of frequency regions of the amplitude envelope, the amplitude envelope being produced from the auxiliary code as an intermediate variable;
   a second demultiplexing step for demultiplexing the sound code into the main codes according to the order determined by said demultiplexing order determination step and for outputting the main codes; and
   a decoding step for decoding the main codes output from said demultiplexing step so as to reproduce a sound signal.

* * * * *